United States Patent [19]

Cohen

[11] 4,447,700
[45] May 8, 1984

[54] RESISTANCE SPOT WELDER ADAPTIVE CONTROL

[75] Inventor: Robert K. Cohen, Troy, N.Y.

[73] Assignee: General Electric Company, Schenectady, N.Y.

[21] Appl. No.: 386,153

[22] Filed: Jun. 7, 1982

[51] Int. Cl.$^3$ .......................................... B23K 11/24
[52] U.S. Cl. .................................. 219/117.1; 219/110
[58] Field of Search ...................... 219/110, 109, 117.1

[56] References Cited

U.S. PATENT DOCUMENTS 3,654,424 4/1972 Vanderhelst ........................ 219/110
4,302,653 11/1981 Denning et al. .................... 219/110
4,329,561 5/1982 Schafer et al. ...................... 219/110

OTHER PUBLICATIONS

Post, C. T., Iron Age, Sep. 26, 1977, pp. 57,58.
Pertron Controls Corp., Instruction Manual, Weldmaster PWC 300, Jul. 1, 1977, pp. 1–10 only.
Chihoski, R. A., Welding Journal, Mar. 1974, pp. 137–149.
Andrews, D. R. et al, Welding Journal, Jun. 1975, pp. 431–435.
Czohara, C. A. et al, Welding Journal, Apr. 1976, pp. 259–263.
Mollica, R. J., Welding Design and Fabrication, Aug. 1978, pp. 70–72.

*Primary Examiner*—C. C. Shaw
*Attorney, Agent, or Firm*—Donald R. Campbell; James C. Davis, Jr.; Marvin Snyder

[57] ABSTRACT

The adaptive controller for a resistance spot welder is implemented with a microcomputer and peripherals to handle the monitoring of several process variable inputs and control the welding machine in real time. Before welding power is applied, electrode load, workpiece thickness and dynamic resistance are measured and must fall within predefined limits in order to continue. The workpiece, if necessary, is conditioned to correct fit-up and surface contamination problems by applying power pulses to lower its resistance. The welding power in each half cycle is dynamically adjusted as a function of workpiece thermal expansion and its first derivative to control formation of the weld nugget, and to control the cooling rate and temper the workpiece. During welding the power limits are adjusted in real time to compensate for electrode flattening and shunt effects. The quality of each weld is diagnosed and machine diagnostics are performed.

17 Claims, 26 Drawing Figures

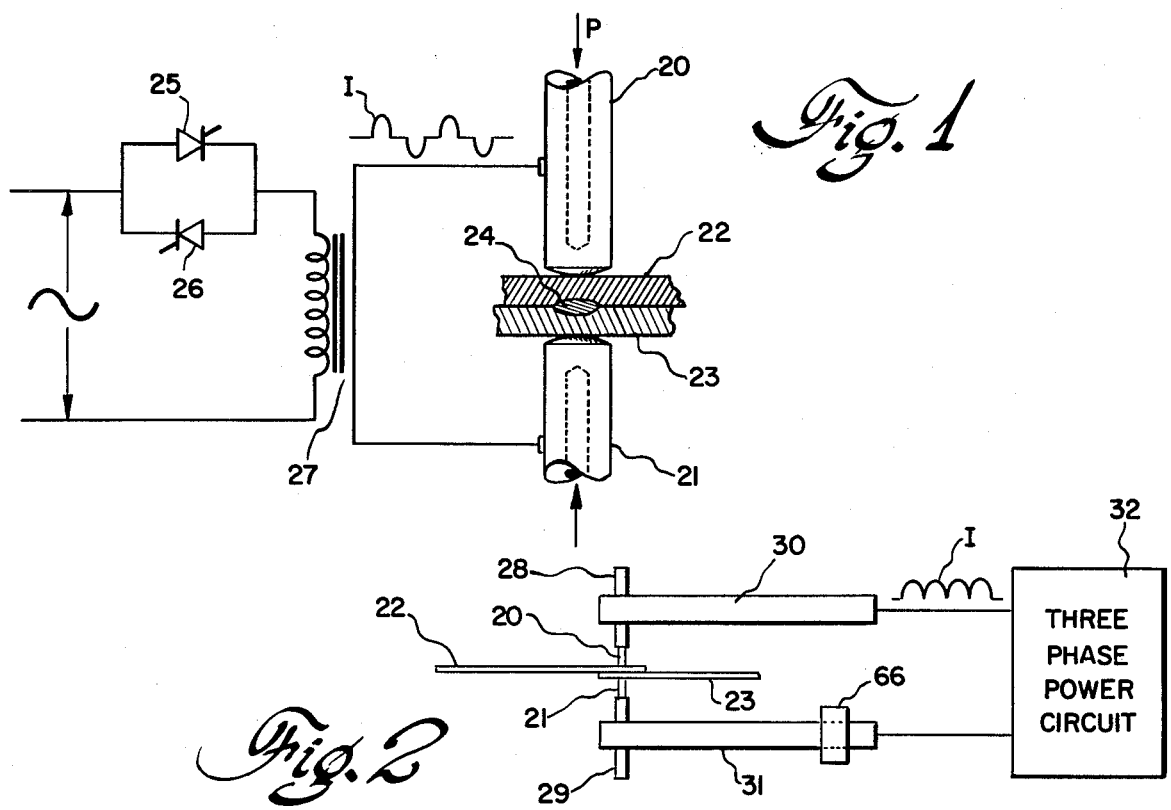
Fig. 1
Fig. 2
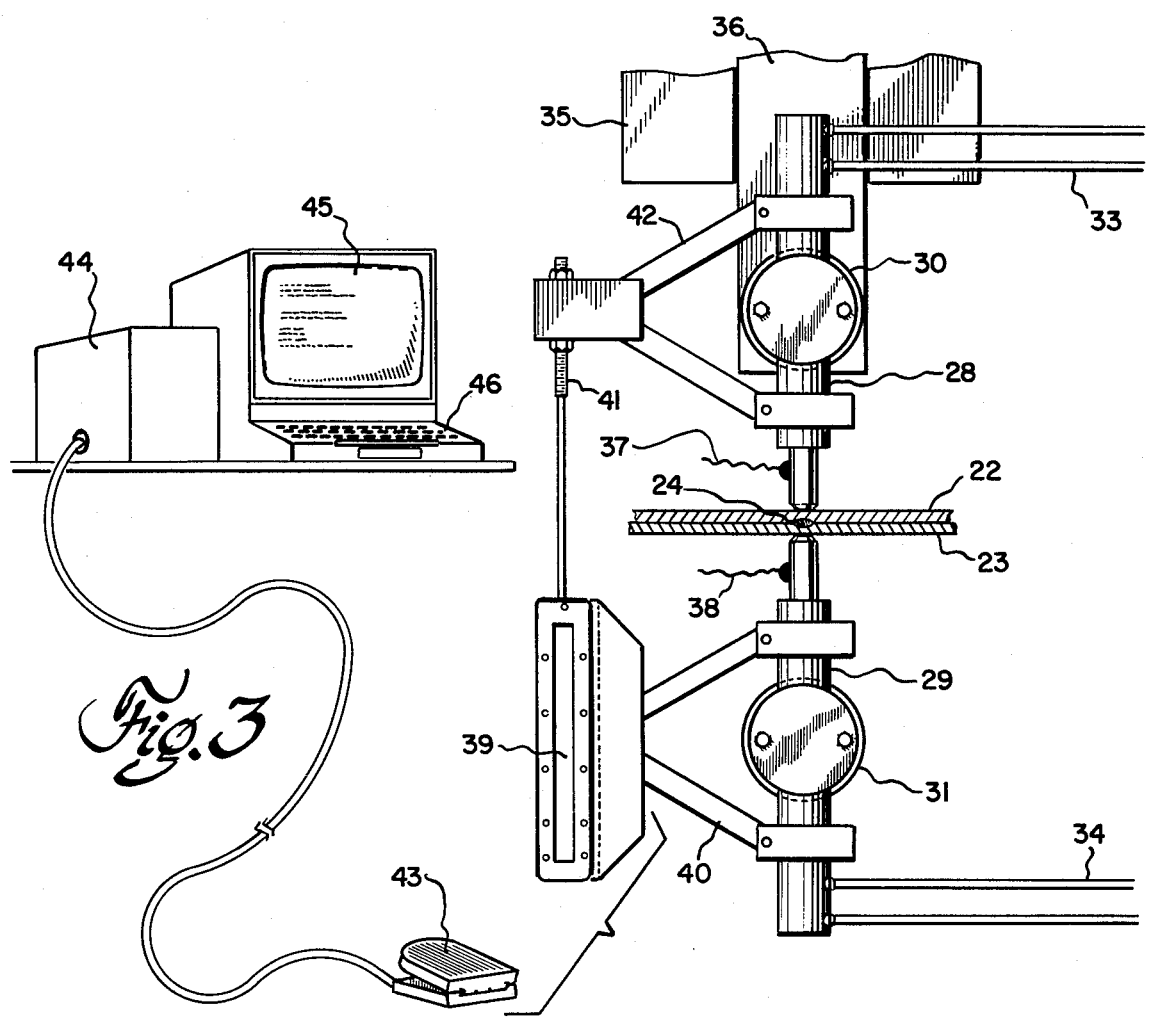
Fig. 3

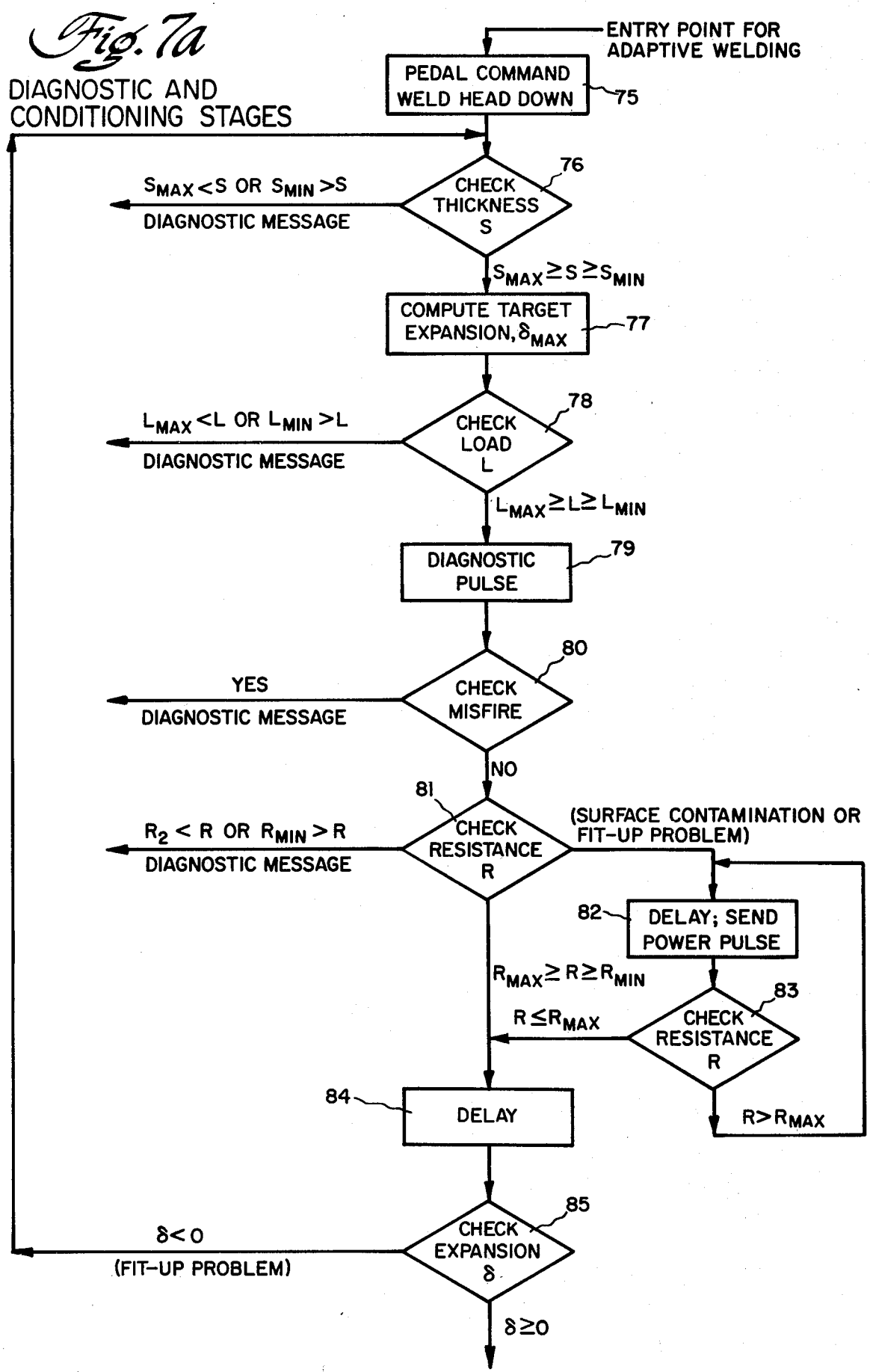

WELDING STAGE

TEMPERING STAGE

RESISTANCE SPOT WELDER ADAPTIVE CONTROL

BACKGROUND OF THE INVENTION

This invention relates to a real time adaptive control and quality assurance system for a resistance spot welder, and to a method of controlling the welding process.

During the weld operation, variations in the process operating point occur from weld to weld due to several conditions such as: material surface variations, variations in workpiece geometry, flattening of electrodes, machine malfunction, operator error, etc. These variations are often impossible for the operator to detect and cause welds of different quality to be produced.

Factory resistance spot welding facilities employ several costly procedures in an attempt to overcome the uncertainty associated with this metal joining procedure. These include making two to three times the number of welds that would be required if all welds were known to be good, the periodic destructive testing of coupon test samples which are supposed to be representative of the actual welding conditions, and brazing of each weld. These quality control procedures are laborious and have a severe impact on factory productivity as well as making the spot welding procedure more complicated, and do not ensure complete reliability of the welding process.

It was therefore necessary to develop a system for resistance spot welding which will provide a new level of reliability and confidence for this basic joining process. The ramifications of allieviating the problem include eliminating destructive testing and extra welds, doing away with the brazing process, in the case of aircraft, shaves a few pounds off engine weight and hundreds of pounds off the total aircraft weight. The complete removal of guess work associated with the spot welding process eliminates the need for a trained operator to control the machine. This makes the invention suitable for applications where the workpieces to be welded are automatically positioned and controlled by robot mechanisms. In addition to the vast increase in productivity which will be realized, resistance spot welding could be employed in place of other joining techniques where more costly procedures such as riveting are utilized. This would greatly broaden the spectrum of applications for resistance spot welding.

Most resistance spot welding machines employ no feedback during the weld process. The operator sets the weld controls, which are established by trial and error, for a given machine/electrode/workpiece configuration. These settings are unique for each machine since they are not defined in terms of calibrated physical properties, performing the same job on a different machine requires new control settings to be established by trial and error. Any change in the operating point of the machine or change in workpiece properties will result in a faulty weld.

There are essentially four types of spot welding monitors/controls on the market which are grouped according to the single parameter measured in the welding process. They are: (1) thermal expansion monitors, (2) nugget resistance monitors, (3) power input (weld energy) monitors, and (4) ultrasonic, acoustic, infrared type monitors. Some of the more recently designed microprocessor-based weld controllers do implement single variable feedback algorithms and are capable of producing good results under certain restricted conditions. The algorithms are limited in complexity and provided compensation only once per weld cycle. These units are difficult to program and require a knowledge of systems theory in order to assure process stability.

The major serious flaw with these units is that no diagnostics are performed along with the in-process feedback algorithm to insure that any change in machine or workpiece characteristics are within sufficient limits to be effectively compensated for by the algorithm. As a result, poor welds can be produced by these systems without being detected. When the process does abort due to an inability of the feedback control to fall within predefined limits, no diagnostic information is provided for the operator describing the nature of the problem. This task is left to the subjective judgment of the operator.

SUMMARY OF THE INVENTION

The real time multivariable adaptive control system for a resistance spot welding machine is capable of automatically controlling the formation of spot welds in process, diagnosing the quality of each weld as it is formed, and performing on-line machine diagnostics before, during, and after each weld. The system is comprised of a plurality of sensors on the machine, a microcomputer and welding machine, sensor and user interfaces. The welding process has a diagnostic stage, a conditioning stage if needed, and welding and tempering stages.

The method of controlling the spot welding process involves diagnosing the condition of the workpieces and machine before welding by measuring certain variables such as workpiece thickness, electrode load, and dynamic resistance. The process is aborted when any of these variables are not within predefined limits and the reason is displayed to the operator. Power pulses are applied only after it has been determined that all of the measured variables are within range and an acceptable weld can be made. When one variable such as dynamic resistance is slightly higher than normal as where there is a mechanical fit-up or surface contamination problem, the workpieces are conditioned by applying one or more power pulses to lower the resistance.

Another feature of the method is that power pulses are applied to the workpieces and welding power is dynamically adjusted in each half cycle as a function of thermal expansion and rate of expansion in order to control the formation of the weld nugget, and to control the cooling rate and temper the welded workpiece. During the diagnostic stage the combined thickness of the workpieces is measured and the maximum expansion to produce a quality weld is computed. The two workpiece variables, expansion and expansion rate, are measured and compared respectively to the maximum value and to predetermined rate limits. The power limits are adjusted in real time to compensate for electrode flattening (mushrooming) and shunt effects. Continuous power pulses are supplied to form the weld nugget until the maximum absolute expansion is exceeded and the expansion rate is less than a predefined value. During the tempering stage, expansion rate is held within limits and power pulses are discontinued when expansion is less than a given value.

An illustrative embodiment of the adaptive (feedback) controller has electrode displacement, load, voltage, and current sensors. An important aspect of the invention is an electromagnetic interference sensor so that signals generated by the foregoing are sampled at the interference zero. Dynamic resistance, welding power, expansion and rate of expansion are computed each half cycle and these and the pulse count are always available. The weld machine control interface has a weld head up/down control line, air pressure and coolant flow lines, and a current control line. The latter adjusts the available power output from the secondary winding of the machine by precisely controlling the conduction times of the power devices on the primary winding. Firing of the SCR's or ignitrons is controlled such that the available power output is directly proportional to the welding power value set by the microcomputer.

BRIEF DESCRIPTION OF THE DRAWINGS

FIG. 1 shows the welded workpiece between electrodes and a single phase electrical circuit;

FIG. 2 is a side view of a welder which has a three-phase power circuit;

FIG. 3 is a partial front view of a pedestal resistance spot welder and the microcomputer system;

FIGS. 7a-7c are simplified program flowcharts of the welding process;

DESCRIPTION OF THE PREFERRED EMBODIMENTS

Figure 4A:
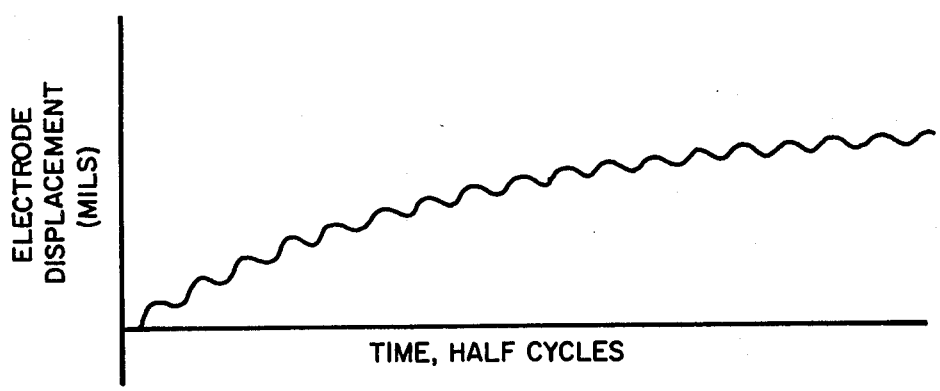
FIGS. 4a-4d show electrode displacement and workpiece dynamic resistance vs. time, and electrode voltage and secondary current waveforms.

This multivariable adaptive controller for resistance spot welders produces better welds with greater repeatability than can be produced by exisiing controllers. Real time compensation is provided over a widely varying range of workpiece and electrode conditions which occur in the factory. The possibility of poor welds passing through production without alerting the weld operator is virtually eliminated. In drastic situations where no weld can possibly be produced or where electrode damage is imminent, the machine automatically produces a diagnostic message indicating the nature of the problem. Some information on resistance spot welding is given, but other than this some familiarity with this welding technique is assumed.

Referring to FIG. 1, the electrical resistance spot welding process of joining two materials due to a localized metallic fusion across their interface is a complicated physcal, chemical, and metallurgical phenomenon. The low electrical resistance electrodes 20 and 21, which carry a high current to a localized area of the workpieces 22 and 23, exert a concentrated force on the outer surfaces of the materials to be joined. This electrode pressure P produces a local deformation at the interface of the metals to be joined and indent the outer surfaces due to the highly concentrated compressive stresses. The purpose of the initial electrode load is to seat properly the workpieces and to maintain good electrical contact. The electrical resistance of the system, composed of the copper electrodes and the two metal sheets to be joined, consists of the material resistances of the copper and the workpieces, plus the surface contact resistances at each material interface. The surface contact resistance is due to surface films, oxides, and asperities at each interface. A high electrode force, producing a localized compressive interface stress, will break down the asperity of the surfaces, thereby providing good contact which will result in reduced surface electrical resistance. Since the resistance of the copper electrodes and metals to be joined is small, a large current discharge is needed to produce the Joule heating effect. The voltage drop and Joule heating effects are largest in the workpieces since the resistivity of the copper electrodes is an order of magnitude less than most metals to be joined.

Some localized heating does occur at the electrode and workpiece interface, but this is small compared to the interior heating in the workpeices. The heat generated by the Joule effect produces an interior temperature increase which is proportional to the time of current discharge. When the time is sufficiently large, the melting temperature is attained which produces an expanding molten metal zone emanating from the workpiece interface. This phase change from solid to liquid creates a large thermal expansion which must be contained by the electrode forces exerted. The cool-down process occurs next forming the spot weld nugget 24 from the molten zone, thereby joining the two workpieces together.

The electrical circuit of the single phase welding machine in FIG. 1 has a pair of inverse-parallel silicon controlled rectifiers 25 and 26 in series with the primary winding of welding transformer 27. The SCR's (older machines have ignitrons) are phase controlled and naturally commutated and control the number and magnitude of the AC welding current pulses supplied to the electrodes. The side view in FIG. 2 shows the electrode holders 28 and 29 and upper and lower conductor arms 30 and 31. This is a three-phase machine; the DC current pulses are either overlapping or non-overlapping. Power circuit 32 typically includes a three phase-to-three phase transformer, the secondary circuit of which supplies current to low voltage rectifiers, which in turn deliver high amperage, low voltage power pulses to the electrodes. The primary circuit has three pairs of inverse-parallel SCR's to control the current.

The front view in FIG. 3 illustrates the electrode water cooling lines 33 and 34, ram housing 35, and ram slide 36 which is attached to conductor arm 30 and moves the upper electrode 20 relative to lower electrode 21. This permits the application of mechanical force to the electrodes before, during, and after the time the current flows in order to produce the proper conditions for heating and welding. Some of the sensors of the multivariable adaptive controller are in this view. The electrode or tip voltage is sensed between leads 37 and 38 attached to the upper and lower electrodes. An experimental setup for sensing vertical electrode displacement uses an optical digital encoder 39 (for instance, Model SST-D49-Eb manufactured by Dynamics Research Corporation), which is mounted on an outrigger 40 off the lower electrode holder 29. It senses the relative motion of the upper electrode through a rod 41 mounted on another outrigger 42 off the upper electrode holder 28 which moves with the upper electrode and bears on a plunger in the top of sensor 39. The operator depresses a foot pedal 43 in order to manually initiate the weld operation. Some units of the experimental adaptive controller are a microprocessor 44, CRT display 45, and user keyboard 46. In a factory welder the controller would be on the side of the machine where controls of the present machine are located.

Figure 4B:
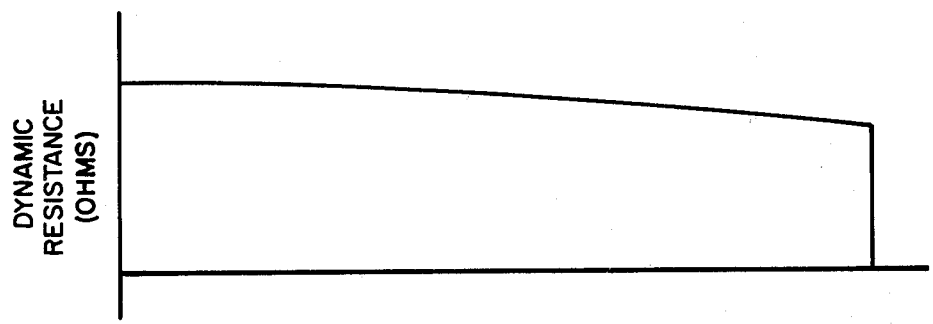

FIGS. 4a–4d are graphs of welding parameters and variables for the welding stage only, for a single phase machine and a workpiece welded on such a machine. A Taylor-Winfield 150 KVA single phase low inertia head machine with a General Electric ignitron welding control was used in the laboratory. FIG. 4a shows electrode displacement vs. time in half cycles; this was an eighteen half cycle weld. It is expected that the curve for a three-phase machine would be smoother without pronounced peaks in each half cycle. FIG. 4b shows the dynamic resistance of the workpiece (the electrical resistance between electrodes), which is calculated from electrode voltage and current when the rate of change of the latter is zero. That is, $$R = \frac{V}{I_{(\frac{di}{dt}=0)}} \quad (1)$$

Figure 4C:
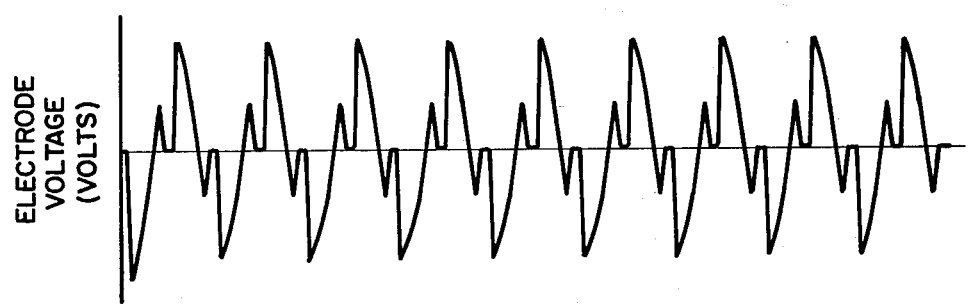
Figure 4D:
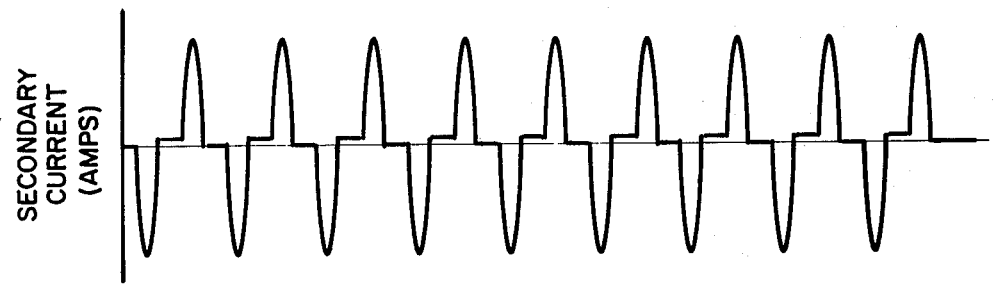

FIGS. 4c and 4d are recordings of electrode voltage and secondary or electrode current.

This invention is a real time adaptive control system for a resistance spot welding machine which is capable of automatically: (1) controlling the formation of resistance spot welds in process, (2) diagnosing the quality of each weld as it is formed, (3) performing on-line machine diagnostics before, during, and after each weld, and (4) logging the results for future reference. It also provides a means to standardize all weld schedule information so that a given weld schedule can be directly applied to any machine regardless of the type, and to simplify the procedure for generating new weld schedules. The adaptive controller is implemented with a microcomputer and specialized peripherals to handle the monitoring of several process variable inputs and controlling the spot welding machine in real time.

Figure 5:
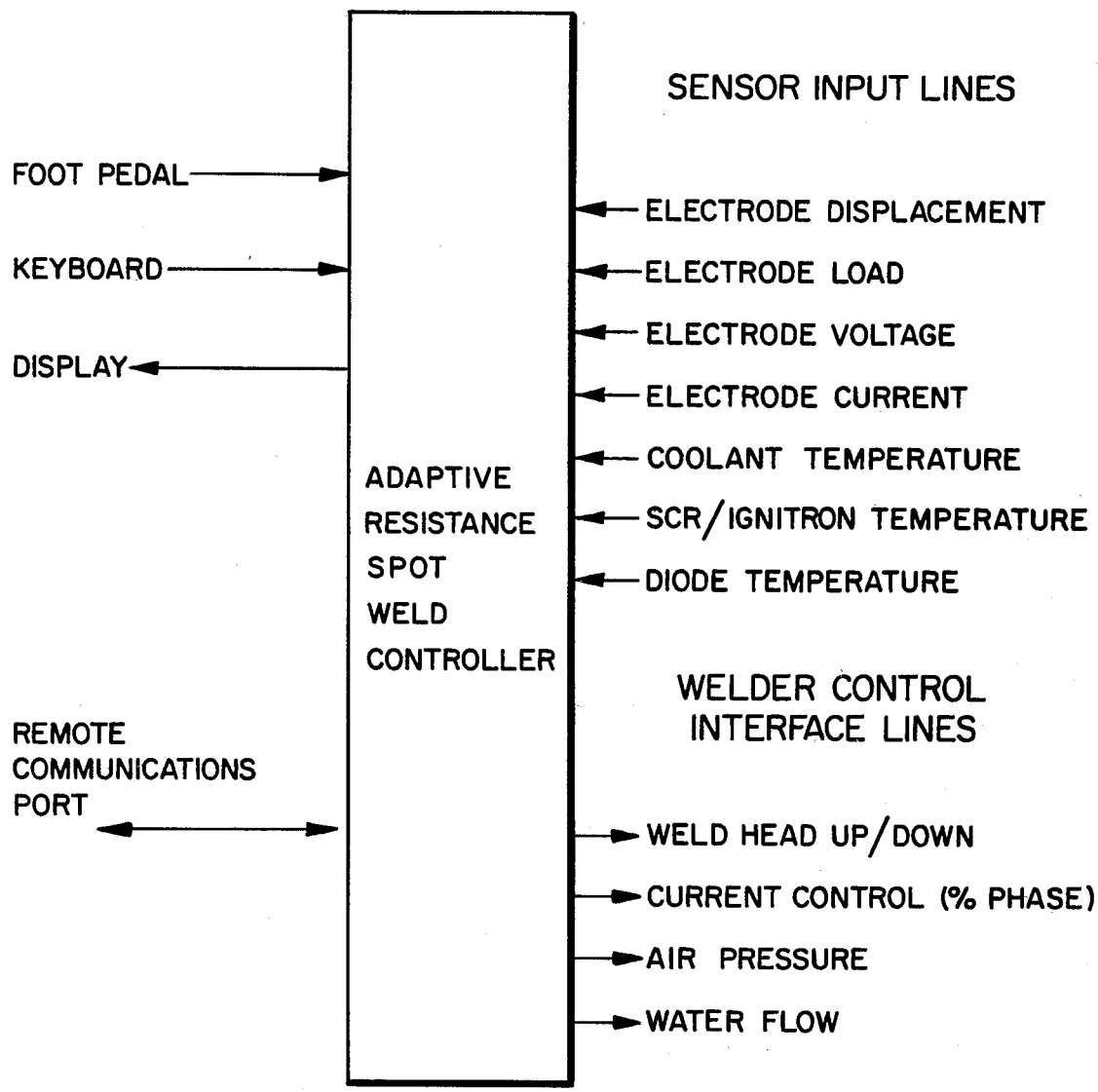
FIG. 5 is an input-output diagram of the adaptive controller.

FIG. 5 is an input/output diagram of the adaptive controller for use with resistance spot welders. The various control and signal data paths are divided into three groups: (1) weld machine control interface lines, (2) sensor input lines, and (3) operator or user interface lines. For the following discussion reference may also be made to FIG. 6, which is block diagram of the welder control system. The weld machine control interface has a weld head up/down control line, current control lines, an air pressure control, and a water flow line. The weld head up/down line controls the direction of motion of the weld head on the resistance spot welder. The air pressure control is used to precisely adjust the force applied by the electrodes on the workpiece to be welded. The water flow line enables the controller to turn the coolant water on and off, and the current control lines are used to control the available power output from the secondary winding of the welder. This is a phase control and precisely controls the conduction times of the power devices, the SCRs or ignitron tubes, in the primary circuit of the spot welder.

The sensor input lines allow the adaptive controller to accurately measure the state of the welding machine as a function of time. These sensors measure the electrode displacement, load, voltage, and current, and the electromagnetic interference pattern produced by the welding machine. The zero crossings of the EMI input signal are used by the adaptive system to control the sampling of the sensor input data, which also corresponds in time to when the first derivative of secondary electrode current is zero which allows the electrode-to-electrode resistance to be conveniently computed from the voltage and current. The coolant temperature, secondary circuit rectifier diode temperature in three-phase machines, and the SCR or ignitron temperature in both single phase and three-phase machines, are sensed.

The user interfaces include a foot pedal, keyboard, display, and a serial communications interface. The keyboard is utilized by the weld operator primarily to recall previously defined job schedules by name (the schedule for a particular machine/electrode/workpiece configuration), and also to input information necessary for the creation of job schedules. The display provides interactive prompting information for the operator during the creation of a new schedule. During normal weld machine operation, the display provides the operator with important job status information indicating the quality of each weld as it is produced. A diagnostic message is generated identifying any condition which prevents completion of an acceptable weld and, where possible, specifying corrective action. A panel with lights instead of a CRT device may be preferred in the factory.

A commercially available RS-232 serial communications interface is provided which allows the adaptive controller to communicate with the outside world. Weld schedules are easily transferred from machine to machine via the communications interface. Diagnostic and quality control information can be echoed to a central source for automatic record keeping and production monitoring purposes. Also, the entire functionality of the adaptive controller is configurable through the RS-232 remote communications port, allowing for direct computer control of the spot welder from an external source. This facilitates the easy synchronization of the weld machine with a robot mechanism to automatically position the workpieces to be welded. If there is robot control, no keyboard and display are necessary but can still be supported in the system.

Figure 6:
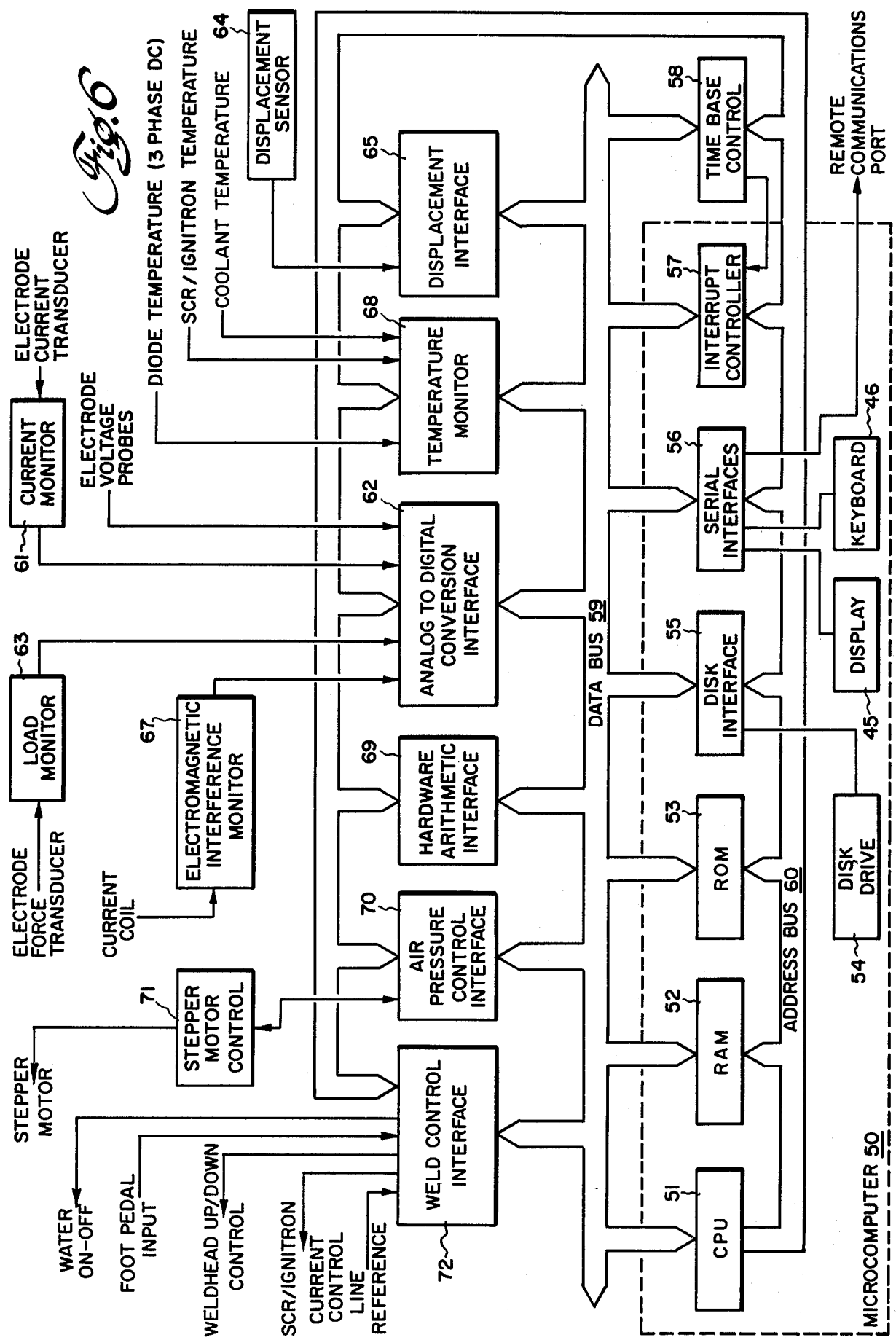
FIG. 6 is a block diagram of the adapative resistance spot welder control system.

FIG. 6 shows the modular elements which comprise the adaptive resistance spot weld controller. The components of microcomputer 50 inside of the dashed line are all commercially available and their function and operation is well understood by those skilled in the art. The central processing unit 51 is, for example, the Z80B CPU sold by Zilog, Inc., Cupertino, Calif. Other components are the random access memory 52, read-only memory 53, disk drive and interface 54 and 55, RS-232 serial interfaces 56, and interrupt controller 57. The weld schedule typically is on a floppy disk and is entered into the RAM 52 along with other data such as material properties and parameters. Alternatively, the program is placed in ROM 53 for dedicated welding applications. The interrupt controller comes into play if there is a break in the normal flow of the system or schedule so that the flow can be resumed from that point at a later time. The time base control module 58 may be a standard unit. The system is configured around 8-bit microcomputer data and address buses 59 and 60, and further includes several modules for interface to the welding machine.

The electrode current sensor is a Hall Effect transducer mounted in the throat of the welding machine (the throat is between conductor arms 30 and 31); current monitor 61 is an amplifier and buffer and the signal is conditioned and scaled for input to the A/D conversion interface 62. Alternatively, secondary current is sensed by a simple coil. The electrode-to-electrode voltage is monitored with the probes 37 and 38 and fed to an A/D converter input. On the experimental welding machine the tip voltage is on the order of 1 volt and secondary current is about 7000-9000 amperes. These two inputs allow the welding power and the workpiece resistance to be dynamically computed, each half cycle or after every power pulse, under software control. Welding power, P, is calculated from electrode current and dynamic resistance as follows:

$$P = I_{RMS}^2 R \qquad (2)$$

The electrode force applied to the workpiece is measured with a piezoelectric load cell which is built into the weld head or can be monitored by a strain gage and bridge circuit mounted on the lower arm 31 of the welder. Load monitor 63 conditions and scales the signal for input to an A/D converter.

The displacement interface allows the microcomputer to dynamically measure the motion of the upper electrode 20. This information is used by the microprocessor to measure the combined thickness of the workpieces to be welded, and the thermal expansion as a function of time as a weld is being produced. Sensor 64 to be used in conjunction with the interface can be any linear or rotational digital encoder with quadrature phase outputs. Several commercially available transducers provide sufficient resolution for this application. Any bending motion as a function of load on the lower arm 31 which holds the lower electrode 21 in place is easily compensated for in software. Displacement interface 65 converts the analog outputs of the displacement device to digital data in a format recognizable by the microcomputer. In a factory machine, the displacement sensor is located in the throat of the welder rather than as shown in FIG. 3. The preferred embodiment of displacement interface 65 is in the inventor's concurrently filed application Ser. No. 386,152, which is assigned to the same assignee.

The large amount of electromagnetic interference in the vicinity of the welder creates a problem if accurate sensor readings are to be obtained. An interference sensor is provided such as the current coil 66 (see FIG. 2) mounted on the lower conductor arm 31 of the welding machine or at another place where some magnetic flux lines cut through the coil. The voltage signal is proportional to the interference at that moment, the interference is zero when the di/dt is zero. This signal is used to determine when the other analog inputs prone to E.M.I. pickup, i.e., the load, current, and voltage signals can be sampled without interference. Displacement is a digital signal which can be sampled at any time with no interference problem. E.M.I. monitor 67 is an amplifier and provides scaling and buffering.

The temperature interface allows the microprocessor to measure the temperatures of the primary cicuit power devices, secondary rectifier diodes on three-phase DC machines, and the electrode coolant water. The coolant water temperature is used in process to compensate for changes in electrode size due to thermal expansion. Other temperature inputs are provided for diagnostic purposes only. The sensors are thermistors, thermocouples, or diodes, and temperature monitor 68 amplifies the signal and offsets it appropriately.

The hardware arithmetic interface 69 augments the system computation capability and removes the burden of performing multiplication and reciprocal operations from the microprocessor CPU 51. This provides the increased bandwidth needed to implement a multivariable algorithm in real time which requires complicated analytic expressions to be computed with each half cycle of weld current. The hardware arithmetic interface has a standard hardware multiplier and a 1/X look-up table. Dynamic resistance is computed rapidly by multiplying electrode voltage by the reciprocal of secondary current.

Air pressure control interface 70 allows the microcomputer to control the electrode force applied to the workpieces to be welded. One way of implementing this is with a stepper motor placed on the valve of the air pressure regulator on the welding machine. Stepper motor control 71 sends pulses to the motor equal to the number of steps to be moved in the clockwise or counterclockwise direction. When the motor hits a limit, an input is sent down to the microcomputer. Faster control bandwidth than obtainable with a stepper motor is realized with a series of fixed air pressure regulators in parallel which have relative weights 1, 2, 4, 8, etc., and can be switched on and off at will by the microcomputer.

Weld control interface 72 allows the welding power to be adjusted in real time with each half cycle of single phase weld current conducted through the workpieces, and each half cycle in each phase on three-phase machines. In addition to controlling the firing of the power devices, it controls firing in such a fashion that the available output power is directly proportional to the control value of current set by the microcomputer. Prior art resistance spot welder controllers dynamically control every full cycle of current. This adaptive controller thus has twice the control bandwidth on single phase machines and six times the control bandwidth on three-phase machines. The line reference signal snychronizes the power control circuit, which is explained in detail with reference to FIGS. 13-15, with the 60 Hz AC power. The weld control interface also allows the microcomputer to control the up and down motion of the weld head, the water coolant flow, and to monitor the user foot pedal input.

A feature of the adaptive controller is that the microcomputer automatically calibrates the sensors at the time of installation. A calibration curve, for instance for electrode load, is generated and stored in the machine for future reference.

The following machine and workpiece parameters and variables are always measured after every power pulse and are always available: electrode voltage, electrode current, welding power, workpiece dynamic resistance, workpiece thermal expansion, rate of change of expansion, time (pulse count), and temperatures. Sensor input data is sampled at the interference zero and read out of interfaces 62, 65, and 68 into RAM 52. CPU 51 and hardware arithmetic processor 69 process this data. All of the modular components have standard input and output computer ports and an addressable control bus system; there are data paths to all the units but only the unit which is turned on processes the data. To illustrate the data flow path, dynamic resistance is calculated by reading current and voltage at the interference zero and storing the digital values in RAM 52. CPU 51 issues an instruction to transfer the data to hardware arithmetic unit 69 where voltage is multiplied with the reciprocal of the current. The product is computed and stored in RAM 52. Thermal expansion is obtained from the displacement sensor and corrected for coolant temperature and any bending of the lower conductor arm due to electrode load. Expansion rate in each 60 Hz half cycle (1/120 sec) is determined from the difference between the present displacement and last displacement.

Figure 7B:
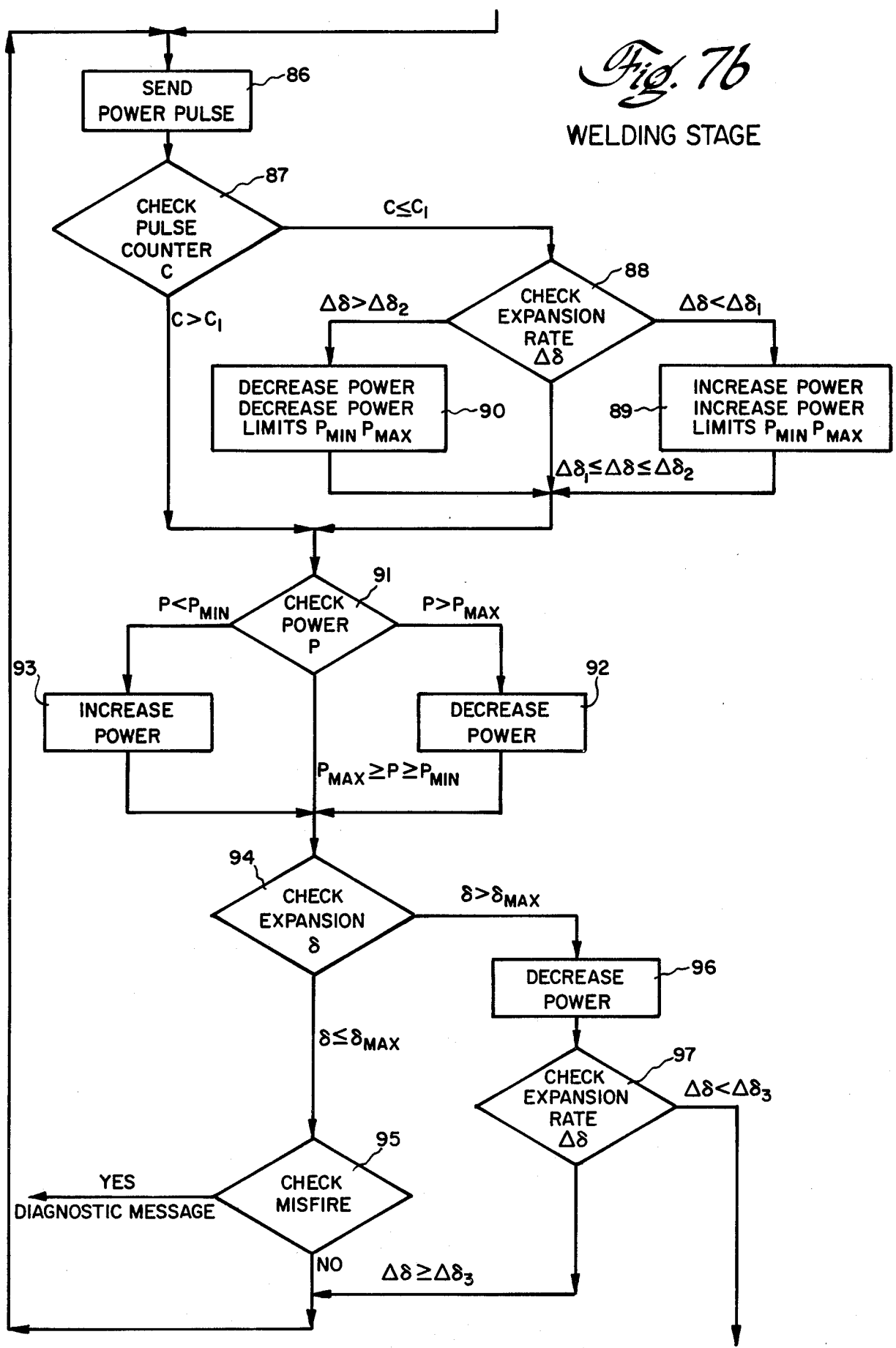
Figure 7C:
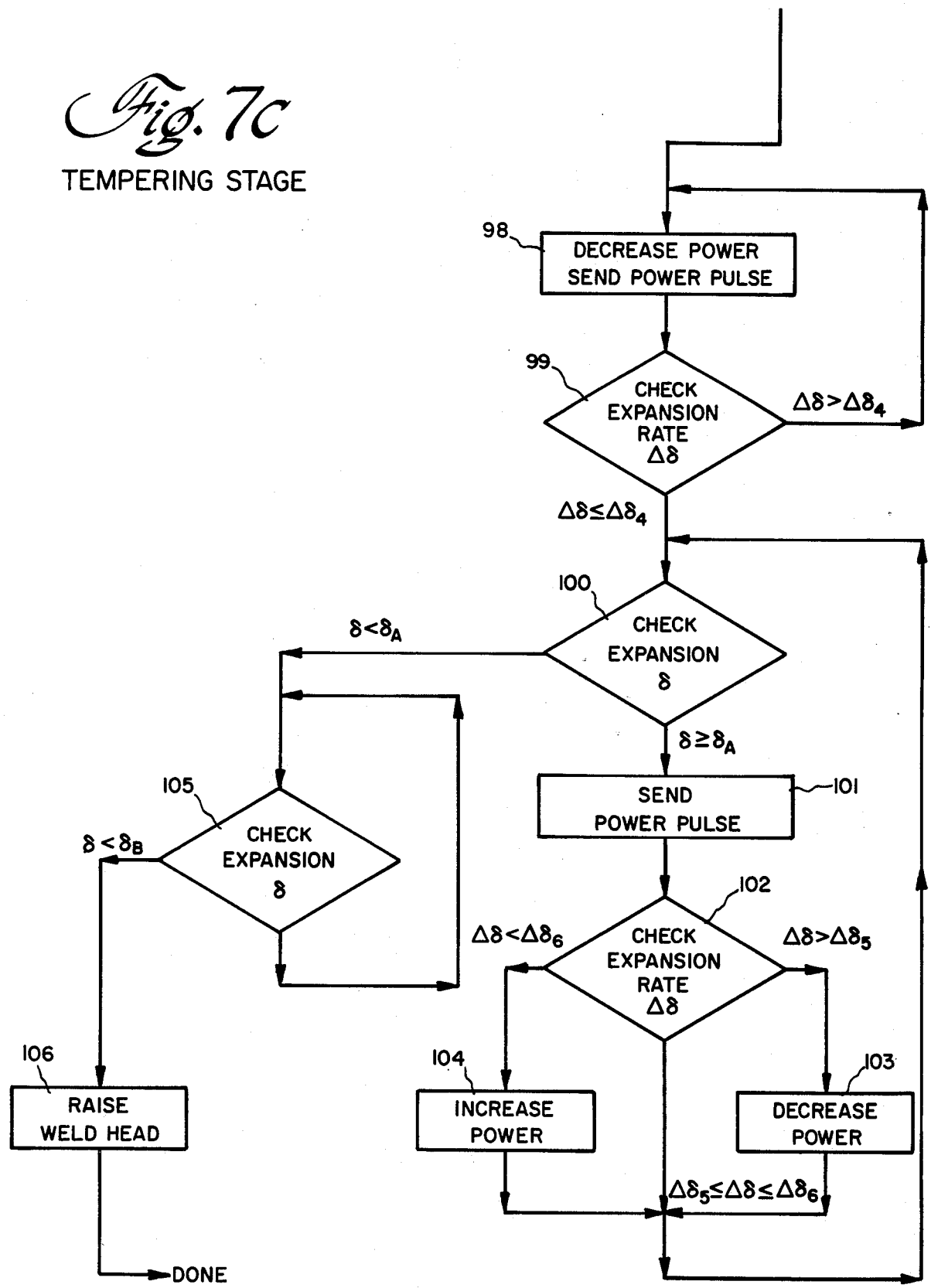
Figure 8:
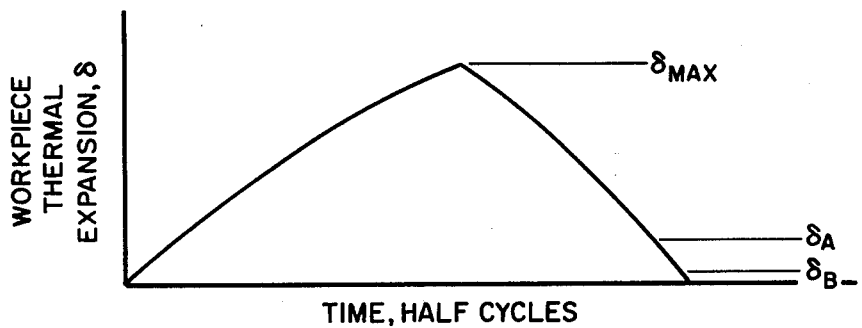
FIG. 8 is a typical curve of workpiece thermal expansion vs. time in half cycles.

The adaptive control system in FIG. 6 has the inherent flexibility needed to automatically produce perfect spot welds over a widely varying range of materials, electrode conditions, and machine operating points. Software is required, however, to control these functions and the total functionality of the machine. FIGS. 7a, 7b, and 7c show a simple program flowchart demonstrating the powerful adaptive welding capability which is easily achieved under software control. The welding process has four stages, a diagnostic stage, a conditioning stage if needed, a welding stage, and a tempering stage. The first two stages are implemented by the sequence of steps in FIG. 7a, and look at the condition of the machine and workpieces and address certain conditions. If a "good" quality weld cannot be made, the controller stops the machine before the welding stage begins. Initial procedure 75 is that the operator steps on the foot pedal, the weld head comes down, and electrode pressure is applied to the workpieces (22 and 23, FIG. 1). The total workpiece thickness and electrode load are measured before welding power is applied. Both of these quantities must fall within certain predefined limits in order for the welding process to continue. The method steps for controlling the welding process are as follows. The first decision step 76 is to measure the combined thickness of the workpiece, S, which must be between a maximum value, $S_{MAX}$, and a minimum, $S_{MIN}$, to continue. If the actual thickness is greater than $S_{MAX}$ or less than $S_{MIN}$, the process will abort and produce a diagnostic message stating the nature of the problem. Step 77 is to compute the target thermal expansion, $\delta_{MAX}$, given the actual measured workpiece thickness and apriori known materials, for an acceptable completed spot weld. The equation for thermal expansion is a generalized polynomial of the form $a_0 + a_1 x + a_2 x^2$, where the coefficients are known and x=thickness. FIG. 8 is a typical idealized expansion curve for the welding and cooling down stages. It has been shown that maximum expansion, $\delta_{MAX}$, is a good discriminant of a quality weld once thickness, load, and resistance have been compensated for. A spot weld expands during its formation in proportion to the volume of liquid formed; because the melted envelope is largely confined, a greater component of volume change is manifested in the vertical direction than in the horizontal direction. At the computed maximum expansion, penetration and nugget diameter are acceptable and pumping more power into the workpiece results in an undesirable enlargement of nugget diameter.

Step 78, FIG. 7a, is to check the electrode load, L, to see if it is between the predefined maximum and minimum values, $L_{MAX}$ and $L_{MIN}$. When the measured load is greater than $L_{MAX}$ or less than $L_{MIN}$, the process aborts and a diagnostic message is generated. Electrode load determines contact resistance values and consequently the weld current. It also affects the electrode tip temperature.

Figure 9:
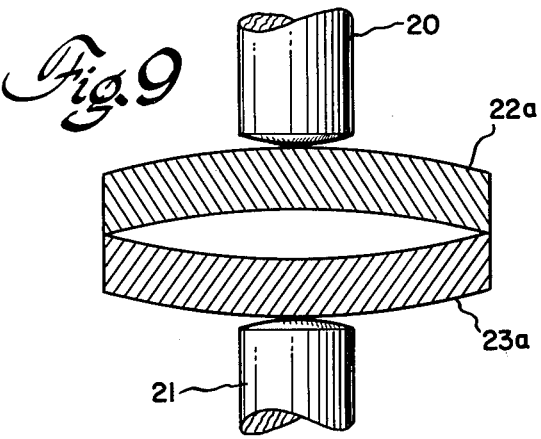
FIGS. 9 and 10 illustrate electrodes and workpieces which have mechanical fit-up and surface contamination problems.
Figure 10:
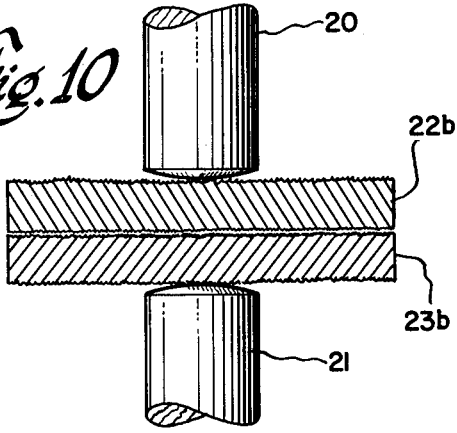

The process continues by applying a short duration low power diagnostic pulse (step 79) in order to measure the workpiece dynamic resistance. A measured resistance which is too low or much too high causes the process to abort. First, according to step 80, a check is made for a power device misfire by examining the computed welding power. A misfire results in the process being aborted and a diagnostic message. If not, step 81 is to check the resistance, R, which is between $R_{MAX}$ and $R_{MIN}$ in order to continue. When the resistance is higher than a second maximum limit, $R_2 > R_{MAX}$, or when the measured resistance is less than $R_{MIN}$, the process aborts and there is a diagnostic message. A slightly higher resistance measurement than normal, higher than $R_{MAX}$ and less than $R_2$, causes the machine to condition the workpieces by applying short power pulses in order to force the workpiece resistance into the specified range for the particular job set up before continuing to weld. The process automatically continues to the next stage if no conditioning is necessary. Variations which cause the resistance to be too high are usually a result of either surface contamination or poor mechanical workpiece fit-up. The latter is illustrated in FIG. 9 where it is seen that workpieces 22a and 23a are not flat. In FIG. 10, workpieces 22b and 23b have surface oxides or other contaminants which increase the electrode-to-electrode resistance.

Figure 11A:
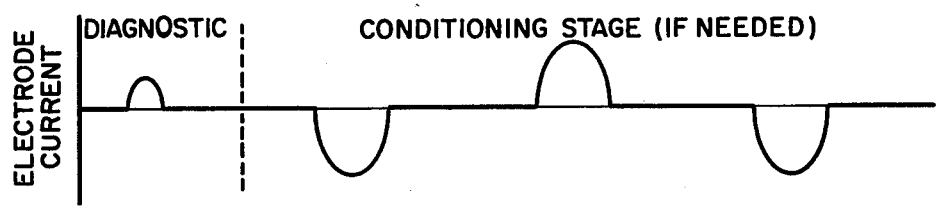
FIGS. 11a and 11b show a sequence of current pulses during the three or four stages of the weld.

To condition the workpieces, step 82 is that after a delay to allow the workpieces to cool down, a power pulse is sent. The resistance is rechecked (step 83), and if R is still higher than $R_{MAX}$, another power pulse is applied and the resistance checked, and steps 82 and 83 are repeated until the measured resistance R is less than $R_{MAX}$. FIG. 11a shows the low power diagnostic current pulse and conditioning stage power pulses. Observe the delay between conditioning power pulses to avoid heating up the workpieces too much. These conditioning power pulses plastically deform the workpiece materials into making better mechanical contact and also burn away surface contaminants.

After a suitable delay (step 84), the next step 85 is to check the thermal expansion, $\delta$. If the expansion is equal to or greater than zero, relative to the thickness measurement made in step 76, the process continues to the welding stage. If the expansion is less than zero, this indicates that there was a fit-up problem and that the workpieces have plastically deformed and their combined thickness has changed. The process returns to step 76 to remeasure the combined thickness, S, and compute a new value of target expansion, $\delta_{MAX}$, based on the new thickness measurement. Steps 77–81, 84 and 85 are repeated, and the workpieces are conditioned again if necessary. There is a limit to the number of power pulses to lower the resistance, say five pulses each time around.

Continuous welding power is supplied from the spot welder upon successful completion of the conditioning process. The power of each half cycle of weld current, after every current pulse, is dynamically adjusted in real time as a function of the workpiece thermal expansion and its first derivative in order to control the precise formation of a weld nugget. Once full weld nugget growth and penetration is obtained, the power is used to control the precise cooling rate of the workpiece. This tempers the workpiece and reduces the thermal stresses across the weld zone which would be produced from normal more rapid cooling.

Figure 12:
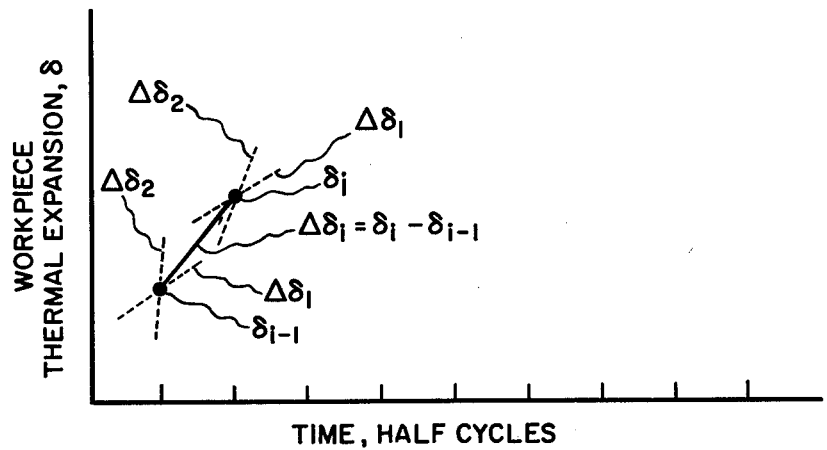
FIG. 12 is used to explain, in conjunction with FIG. 7b, rate of expansion and expansion rate limits.

FIG. 7b is the welding stage program flowchart. Steps 86 and 87 are that a power pulse is applied and a counter is checked for the pulse count C. If C is less than $C_1$, say five pulses, the expansion rate, $\Delta\delta$, is measured as indicated at 88. The process continues when the expansion rate is between the two rate limits $\Delta\delta_1$ and $\Delta\delta_2$. If the measured expansion rate is less than the lower limit, $\Delta\delta_1$, step 89 is that the welding power is increased and also the power limits $P_{MIN}$ and $P_{MAX}$. Alternate step 90 is that the welding power and power limits are decreased when the expansion rate is greater than $\Delta\delta_2$. FIG. 12 illustrates the two rate limits at points i and i−1, and the expansion rate at ith point $\Delta\delta_i$, which is the difference between the expansion of the ith point and the expansion at the i−1 point. The rate of change of expansion is controlled to be within the two limits. This prevents pumping too little or too much power into the workpieces to achieve an acceptable weld. Steps 89 or 90, FIG. 7b, are repeated until the rate of change of expansion is within the predefined limits.

Figure 11B:
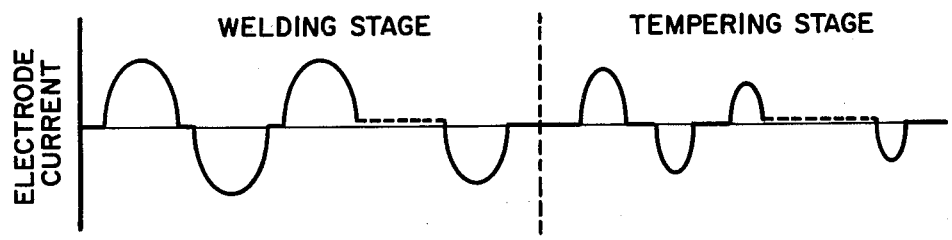

The control method continues by checking the welding power P, and decreasing or increasing the power at 92 and 93 so that the power is between $P_{MAX}$ and $P_{MIN}$. Step 94 is to check the value of expansion, $\delta$, and go on to check SCR or ignitron misfire at 95 when the absolute expansion is lower than $\delta_{MAX}$. Steps 86–95 are repeated as long as the pulse count C is less than $C_1$. After a predetermined number of power pulses, for instance, five, steps 88–90 are not done and the procedure is only to check power, expansion, and misfire while dynamically adjusting the welding power to be within limits. Continuous welding power pulses are applied to the workpieces, as illustrated in FIG. 11b, until the absolute expansion is greater than $\delta_{MAX}$. One reason for changing the power limits in blocks 89 and 90 is that older electrodes may be flattened (mushroomed) or nearby adjacent welds may shunt current away with the result that there is less expansion for a given amount of power. The power limits are stepped up to compensate. The machine has a drifting operating point depending on where the engineer wants the limits. Supervisory software may be provided to realize adaptive compensation.

At step 96 the welding power is decreased as soon as the targeted maximum expansion is reached, and the expansion rate is checked at 97. For so long as the rate of change of expansion is greater than the preset limit $\Delta\delta_3$, steps 86, 87, 91–97 are repeated and the welding power is decreased each time until the measured expansion rate is less than the limit $\Delta\delta_3$. At this point (see FIG. 8) the expansion curve is flattening out. Two things are required to break out of the welding stage into the tempering stage: absolute expansion is greater than the computed maximum value, $\delta_{MAX}$, and the rate of change of expansion is less than a minimum value, $\Delta\delta_3$.

During the tempering stage, the welding power is dynamically adjusted in real time to control the precise cooling rate of the workpiece. The rate at which heat is dropping is controlled. This tempers the workpiece and reduces the thermal stresses across the weld zone which would be produced from normal more rapid cooling. The electrode load and the cooling rate affect the metallurgy of the weld, and this can be precisely controlled. The rate of change of expansion at this time is negative.

Referring to FIG. 7c, steps 98 and 99 of the method of controlling the welding process are to decrease the power, send a power pulse, and check the expansion rate. These are repeated so long as the rate is greater than a limit $\Delta\delta_4$, which has a negative slope. When the measured expansion rate is less than this, the absolute expansion is checked at 100 to see if it is greater than the first limit $\delta_A$ found in FIG. 8. Steps 101–104 are to apply a power pulse, check the expansion rate, and decrease or increase the welding power depending on whether the rate is greater than an upper limit $\Delta\delta_5$ or lower than the lower limit $\Delta\delta_6$. These steps are repeated in order to maintain the expansion rate between these limits by applying continuous welding power pulses as shown in FIG. 11b, until the measured expansion is less than $\delta_A$.

If the workpieces have cooled down enough, the expansion measured at step 100 is less than $\delta_A$ and the power pulses are discontinued. Step 105 is that the absolute expansion, $\delta$, is remeasured as many times as is necessary for the workpiece to cool down to the point where expansion is lower than the second limit $\delta_B$ shown in FIG. 8. This second limit may be a negative number because the electrodes under load indent the surfaces of the workpieces. The last step 106 is that a command is issued to raise the weld head. The weld is done and the welded workpiece is removed from the machine.

The microprocessor-based adaptive controller has sufficient flexibility that other welding variables, such as dynamic resistance of the workpieces, may be monitored and used to control the welding process. The sharp drop in dynamic resistance, FIG. 4b, is an indication that the end of the welding stage is near.

Figure 13A:
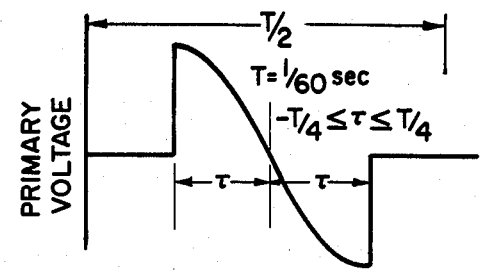
FIGS. 13a and 13b show primary voltage for one-half period and a current pulse and are used to derive an expression for $I_{RMS}^2$.
Figure 13B:
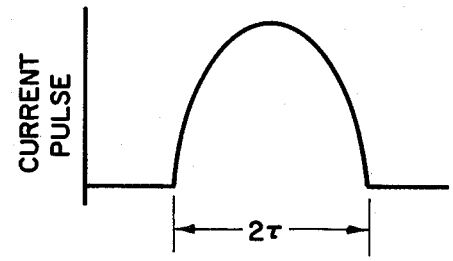

It has been emphasized that the welding process is controlled every half cycle of a single phase machine, and every half cycle of each phase of a three-phase machine. The power control circuit in weld control interface 72, FIG. 6, more specifically the SCR/ignitron current control, is explained referring to FIGS. 13a–15. The power devices are phase controlled and naturally commutated, and the power control circuit produces firing signals to turn on the positive and negative devices. FIGS. 13a and 13b show one-half cycle of the primary circuit voltage and current for the single phase machine in FIG. 1. The time $\tau$ is measured from the voltage zero and is equal to half the width of the current pulse. Increasing the commanded welding power increases both the width and amplitude of the current pulse; the maximum width is a full half cycle, $T/2$. It is recalled that the firing of the SCR's is controlled in such a fashion that the available output power is directly proportional to the welding power value commanded by the microcomputer.

The following equations give the derivation of $\tau$ as a function of $I_{RMS}^2$ ($P = I_{RMS}^2 R$):

$$I(t) = -\int_{-\tau}^{t} \sin\omega t\, dt \quad -\tau \geq t > \tau \tag{3}$$

-continued $$I^2_{RMS} = \frac{2}{T} \int_{-T/4}^{T/4} I(t)^2 \, dt \quad (4)$$

Substituting, $$I^2_{RMS} = \frac{2}{T} \int_{-T/4}^{T/4} \left[ -\int_{-\tau}^{t} \sin \omega t \, dt \right]^2 dt \quad (5)$$

Then, $$I^2_{RMS} = F(\tau) \quad (6)$$

That is, $I_{RMS}^2$ is some function of $\tau$, the current pulse half width. The transform is:

$$\tau = G(I_{RMS}^2) \quad (7)$$

Figure 15:
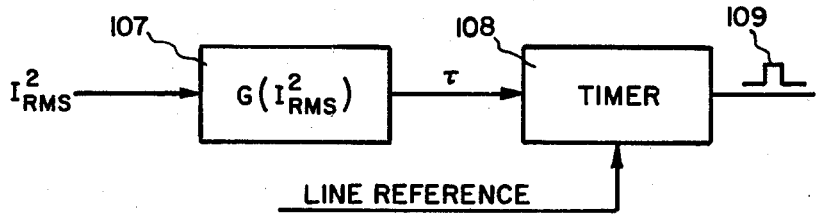
FIG. 15 is a block diagram of the SCR current control circuitry which generates a firing pulse sent to the appropriate SCR.

Equation (7) is the analytic model on the circuit board in FIG. 15.

Figure 14A:
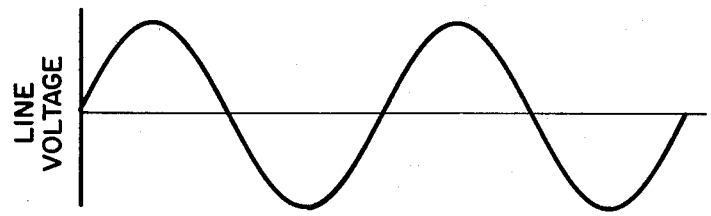
FIGS. 14a-14e are waveform diagrams of single phase line voltage, the line reference, primary voltage and electrode current, and a timing diagram of the SCR firing signals.
Figure 14B:
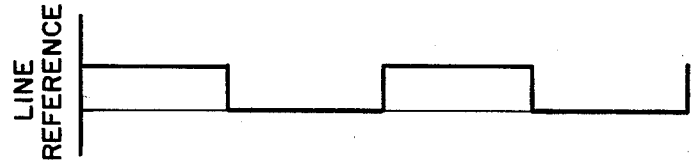
Figure 14C:
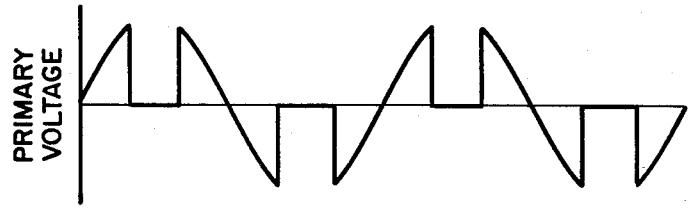
Figure 14D:
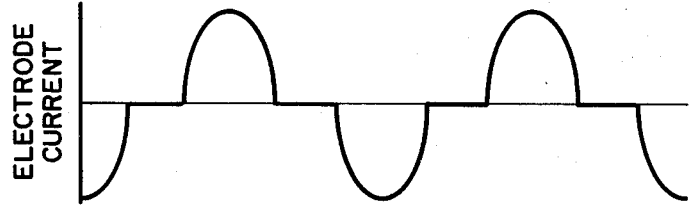
Figure 14E:
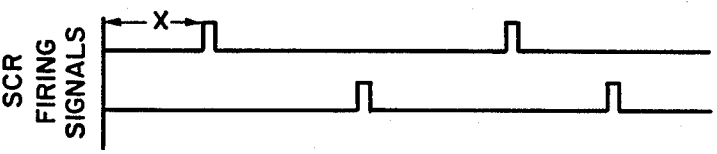

FIG. 14a shows the single phase line voltage, and FIG. 14b the logic level line reference denoted in FIG. 6 as an input to weld control interface 72. The primary circuit voltage and secondary current are illustrated in FIGS. 14c and 14d. The effect of increasing the welding current is to decrease the width of the "notch" in the primary voltage waveshape, and decreasing the current increases the width of the "notch". The SCR firing pulses are timed from the line reference. The top line in FIG. 14e shows the positive SCR firing signals and the bottom line shows the negative SCR firing signals. These are the logic level firing pulses generated by weld control interface 72 and sent to the power device firing circuits.

FIG. 15 is a simplified block diagram of the power control circuit. Knowing the commanded value of welding power and the dynamic resistance, the quantity $I_{RMS}^2$ is calculated and fed to analytic model circuitry 107. The model is equation (7). The time $\tau$ is outputted and presented to timer 108 which generates the firing pulse 109 sent to either the positive or negative SCR. In the first line of FIG. 14e, $X = T/2 - \tau$, and is the time from the line voltage zero to generation of the firing pulse.

In conclusion, the microprocessor-based adaptive controller for resistance spot welders produces quality welds with good repeatability. Compensation is provided over a range of workpiece and electrode conditions that occur in the factory. Poor welds are virtually eliminated. Where no weld can be produced or where electrode damage is imminent, the machine produces a diagnostic message indicating the problem.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A method of controlling a resistance spot welding process practiced on a welding machine which applies an electrode mechanical load to the workpieces and has a primary circuit and a secondary circuit that supplies power to the electrodes, comprising the steps of:
    diagnosing the condition of said workpieces and machine before welding by measuring certain variables and determining that these variables are within predefined limits;
    applying power pulses to weld said workpieces, measuring workpiece thermal expansion and expansion rate after every welding pulse and comparing respectively to a known target maximum expansion and to preset expansion rate limits, and dynamically adjusting the welding power as a function of workpiece thermal expansion and rate of expansion in order to control the formation of a weld nugget; and
    supplying additional power pulses and dynamically adjusting the welding power after every power pulse to control the cooling rate and temper the welded workpiece.

2. The method of claim 1 wherein said welding power is measured during every welding power pulse and increased or decreased to bring said expansion rate and power within limits and compensate for flattened electrodes and current shunting.

3. The method of claim 2 wherein the diagnosing step comprises measuring the combined thickness of said workpieces and computing said maximum expansion, and power pulses are applied to form the weld nugget until said maximum expansion is exceeded and said expansion rate is less than a predetermined value, and thereafter during the cooling stage until said thermal expansion is lower than a predefined value.

4. The method of claim 1 wherein electrode displacement, electrode load, electrode voltage and electrode current are sensed each half cycle, a count of power pulses is made, and dynamic resistance, welding power, workpiece thermal expansion, and rate of expansion are computed each half cycle.

5. The method of claim 1 wherein secondary circuit electromagnetic interference is sensed, and said load, voltage, and current are sensed at the interference zero.

6. The method of claim 1 including the step of conditioning said workpieces before welding by applying one or more power pulses to bring one variable, initially out-of-limits, within said predefined limits.

7. The combination of a multivariable adaptive control and quality assurance system with a resistance spot welding machine which applies an electrode mechanical load to the workpieces and has a primary circuit with power devices to control the current and a secondary circuit that supplies power pulses to the electrodes, comprising:
    a plurality of sensors on said machine which measure selected machine and workpiece parameters;
    a microcomputer system and means for interfacing the signals generated by said sensors with said microcomputer system, and for interfacing commands generated by said microcomputer system with said welding machine;
    said microcomputer system and interfaces comprising means for diagnosing the condition of said machine and workpieces before welding by determining that certain of said parameters and welding variables derived from said measured parameters are within limits to realize an acceptable weld, and when not aborting the welding process; and means for producing power device firing signals to generate power pulses, and for dynamically adjusting the welding power in each half cycle of weld current as a function of workpiece thermal expansion and rate of expansion to control the formation of a weld nugget and to control the cooling rate of the welded workpiece.

8. The combination of claim 7 wherein said sensors include an electromagnetic interference sensor whereby other sensors can be sampled at the interference zero.

9. The combination of claim 7 including a hardware arithmetic interface to augment the computational capability of said microcomputer system.

10. The combination of claim 7 wherein said means for interfacing with the welding machine has power control circuitry which generates said power device firing signals in each half cycle of weld current and is comprised of a look-up table in which a function of $\tau$, a time equal to half the current pulse width, is expressed as a function of $I_{RMS}^2$, where I is the weld current, and a timer which produces said firing signals at a time after the primary circuit voltage zero which depends on $\tau$.

11. A method of controlling a resistance spot welding process practiced on a welding machine which applies an electrode mechanical load to the workpieces and has a secondary circuit that supplies power to the electrodes, comprising the steps of:
diagnosing the condition of said workpieces and machine before welding by measuring certain variables including the combined thickness of said workpieces and dynamic resistance, and electrode load;
conditioning said workpieces when the measured dynamic resistance is above-limits but not higher than a predetermined value in order to correct surface contamination and mechanical fit-up problems, by applying one or more power pulses to reduce said dynamic resistance;
aborting the process when at least one variable is not within predefined limits; and
applying power pulses to weld said workpieces after it has been determined that all of said variables are within range such that an acceptable weld is achievable.

12. The method of claim 11 wherein secondary circuit electromagnetic interference is sensed, and welding parameters from which at least some of said variables are derived are sensed at the electromagnetic interference zero.

13. The method of claim 1 and the steps of computing target expansion values from the combined thickness of said workpieces, measuring workpiece thermal expansion and, in the case of negative expansion indicating there was a fit-up problem, remeasuring the combined thickness of said workpieces in order to recompute target expansion values.

14. The method of claim 11 and displaying a diagnostic indication to the operator giving the reason for aborting the process and corrective action where possible.

15. A multivariable adaptive controller to be used with a resistance spot welding machine which applies on electrode mechanical load to the workpieces and has a primary circuit with power devices to control the current and a secondary circuit that supplies power pulses to the electrodes, comprising:
a plurality of sensors on said machine which measure selected workpiece and machine parameters;
first means for diagnosing the condition of said workpieces and machine before welding by checking the thickness of said workpieces and electrode load and by producing a low power diagnostic pulse and checking power device misfire and workpiece dynamic resistance and determining that these variables are or are not within predefined limits to realize an acceptable weld, and aborting the welding process in the latter case;
second means for conditioning said workpieces before welding by generating one or more power pulses to correct surface contamination and mechanical fit-up problems and bring dynamic resistance, initially out-of-limits, within said predefined limits; and
third means for producing power pulses, measuring welding power and workpiece variables during every power pulse, and dynamically adjusting said welding power after every power pulse to control the formation of a weld nugget.

16. The controller of claim 15 wherein said workpiece variables are thermal expansion and rate of expansion.

17. The controller of claim 16 wherein said first means includes means for displaying to the operator the reason for aborting the welding process.

* * * * *